United States Patent [19]

McConnell

[11] Patent Number: 4,715,924

[45] Date of Patent: Dec. 29, 1987

[54] APPARATUS FOR FORMING A WEB

[75] Inventor: Ronald F. McConnell, West Chester, Pa.

[73] Assignee: E. I. Du Pont de Nemours and Company, Wilmington, Del.

[21] Appl. No.: 445,166

[22] Filed: Nov. 29, 1982

[51] Int. Cl.⁴ .............................................. D04H 3/02
[52] U.S. Cl. ..................................... 156/433; 19/299; 19/301; 156/181
[58] Field of Search ............... 156/167, 181, 433, 436, 156/439, 440, 441, 575; 19/296, 299, 159 R, 300, 301; 28/101, 184, 21, 103, 289; 226/44, 97, 75; 264/168; 428/371; 364/469, 470; 57/244, 350; 53/467, 473, 475, 116, 522; 425/376 B; 118/680, 325, 321, 306, 317; 434/83, 95, 104; 74/26, 37, 149

[56] References Cited

U.S. PATENT DOCUMENTS

| | | | |
|---|---|---|---|
| 3,226,794 | 1/1966 | Erb | 28/289 X |
| 3,318,013 | 5/1967 | Erb | 229/63 |
| 3,378,898 | 3/1965 | Mendes | 28/21 |
| 3,616,070 | 10/1971 | Lemelson | 156/446 |
| 3,902,644 | 9/1975 | Bous | 226/44 |
| 4,069,566 | 1/1978 | Sumitomo et al. | 28/289 |
| 4,137,354 | 1/1979 | Mayes, Jr. et al. | 156/175 X |
| 4,163,305 | 8/1979 | Semjonow et al. | 19/299 |
| 4,185,064 | 1/1980 | Schippers | 264/210.2 |
| 4,247,503 | 1/1981 | Venot et al. | 264/168 |
| 4,353,772 | 10/1982 | Groeber | 156/433 |

FOREIGN PATENT DOCUMENTS

| | | | |
|---|---|---|---|
| 0110698 | 6/1984 | European Pat. Off. | |
| 3003666 | 8/1981 | Fed. Rep. of Germany | |
| 0482903 | 1/1973 | Japan | 156/167 |
| 1088931 | 10/1967 | United Kingdom | 19/299 |
| 2024052 | 1/1980 | United Kingdom | |

OTHER PUBLICATIONS

American Machinist, vol. 125, No. 11, Nov. 1981, pp. 3, 179.

Primary Examiner—Donald E. Czaja
Assistant Examiner—Ramon R. Hoch

[57] ABSTRACT

A robotized apparatus for forming a web to be used as a reinforcement in a plastic composite. The apparatus has a dispensing head including a freely rotatable tube which is moved according to a desired pattern. The tube terminates in a horn from which a continuous strand is delivered into a bed of pins.

7 Claims, 11 Drawing Figures

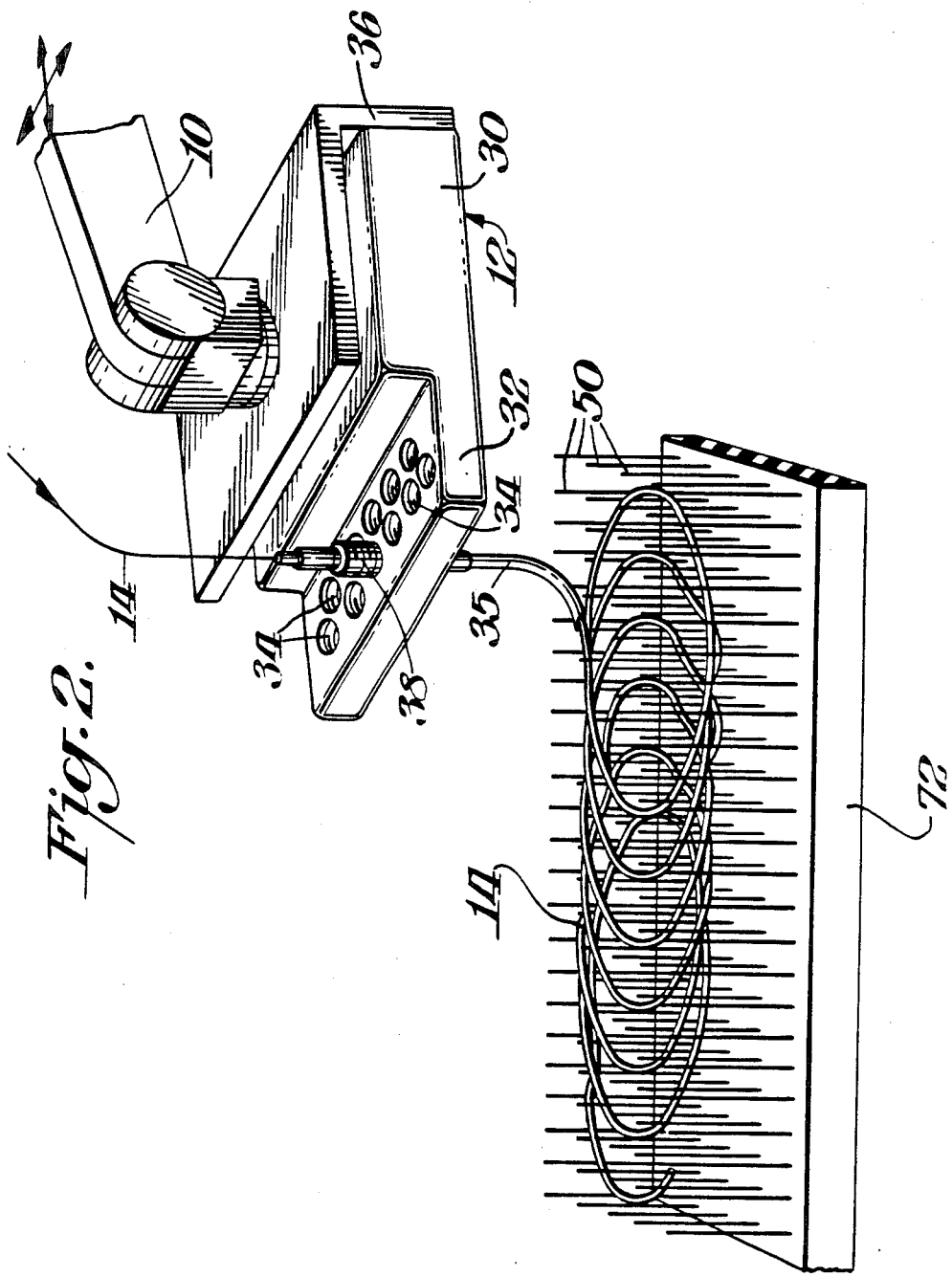

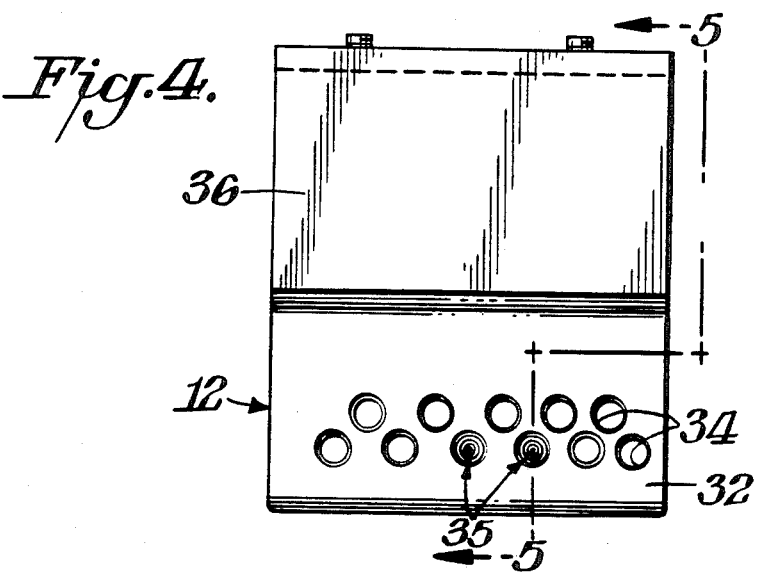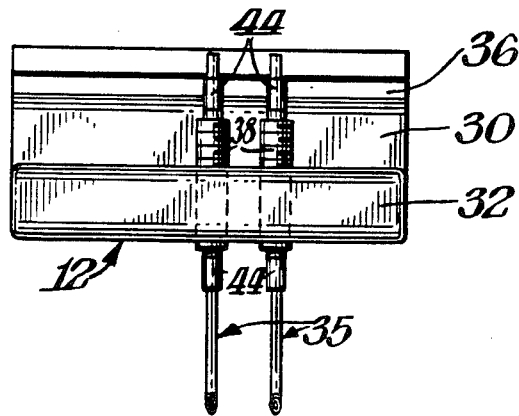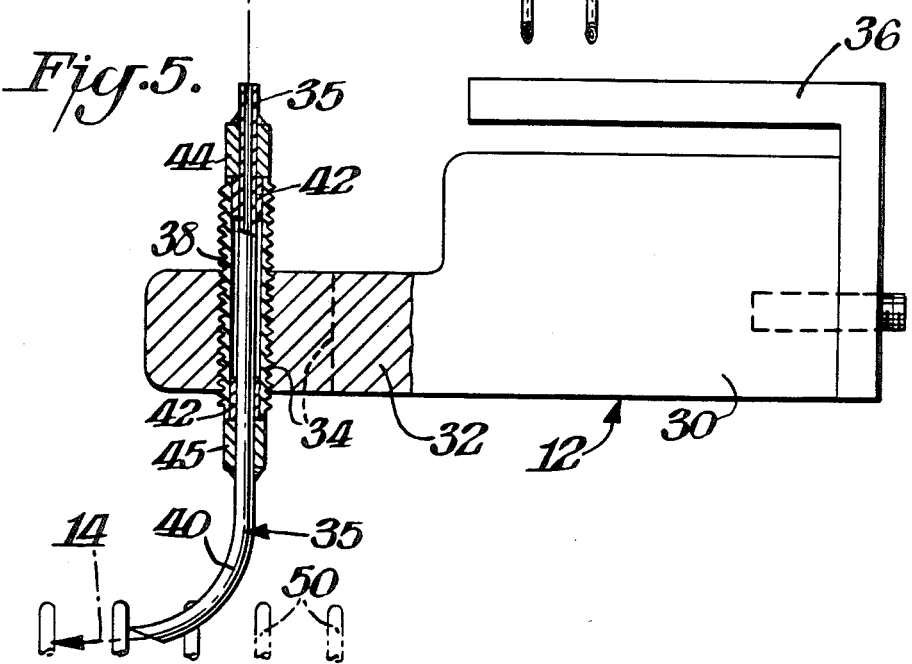

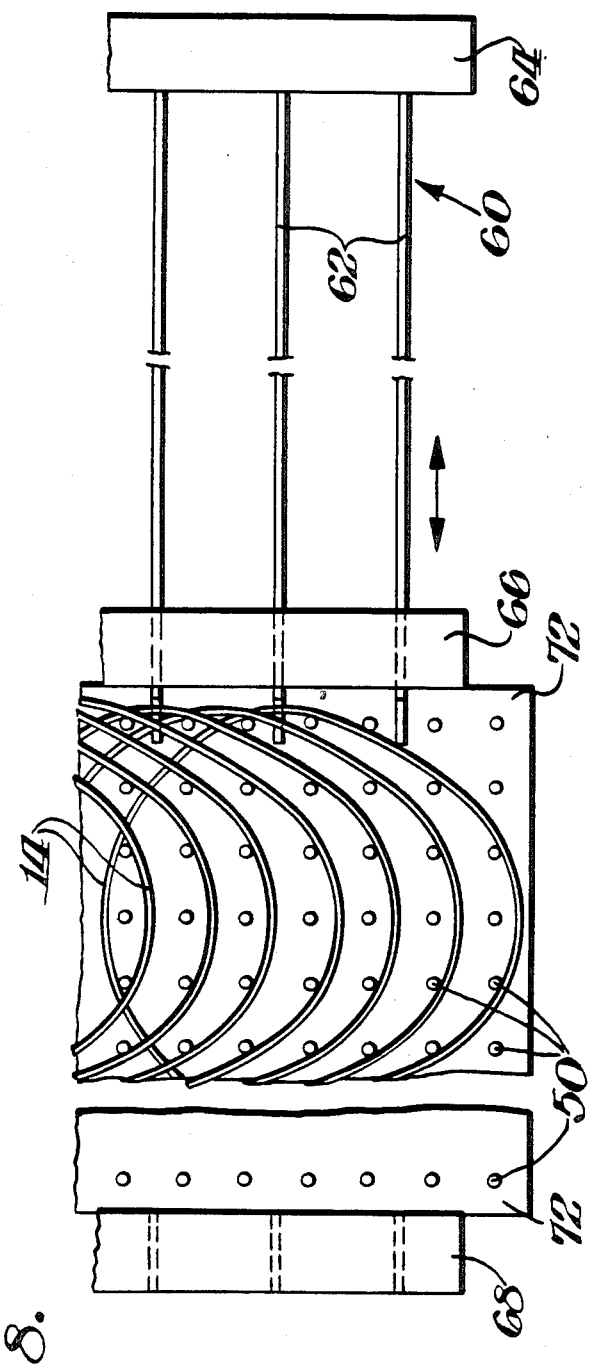
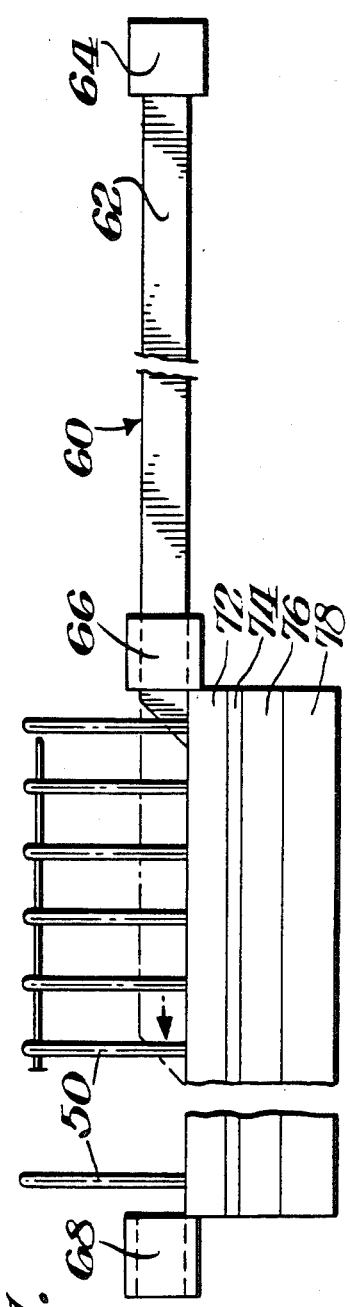
Fig. 8.
Fig. 7.

APPARATUS FOR FORMING A WEB

BACKGROUND

Plastic composites reinforced with fibers are known and used in a wide variety of aerospace, industrial and sporting applications. Initially, the reinforcing structures were woven fabrics which provided uniformity throughout the composite. However, nonwoven webs are now being used because they are less expensive than woven fabrics. Normally, such webs have been laid down randomly or in a semi-ordered fashion. It is now recognized that improved composites can be produced if the nonwoven web is laid down in a precisely ordered fashion. In some composites, complete uniformity is required, whereas, in other composites, the fiber density should be greater at the locations where the stresses are greater.

SUMMARY

With the apparatus of the present invention, reinforcing webs are formed by depositing a continuous, filamentary strand in a bed of deflectible pins according to a desired pattern. The apparatus has a dispensing head attached to an automated manipulator and the head includes a freely rotatable, strand-guiding tube which projects into the bed and terminates in a horn adapted to deflect the pins it engages as a strand is deposited.

DRAWINGS

FIG. 2 is a fragmentary, perspective enlargement of the apparatus.

FIGS. 3-5 are front, top and side views of the winding head shown in FIGS. 1 and 2, FIG. 5 having been taken on line 5—5 in FIG. 4.

FIGS. 7 and 8 are side and top views of a device for transferring a web from the bed of pins shown in FIGS. 1 and 2.

DESCRIPTION

Figure 1:
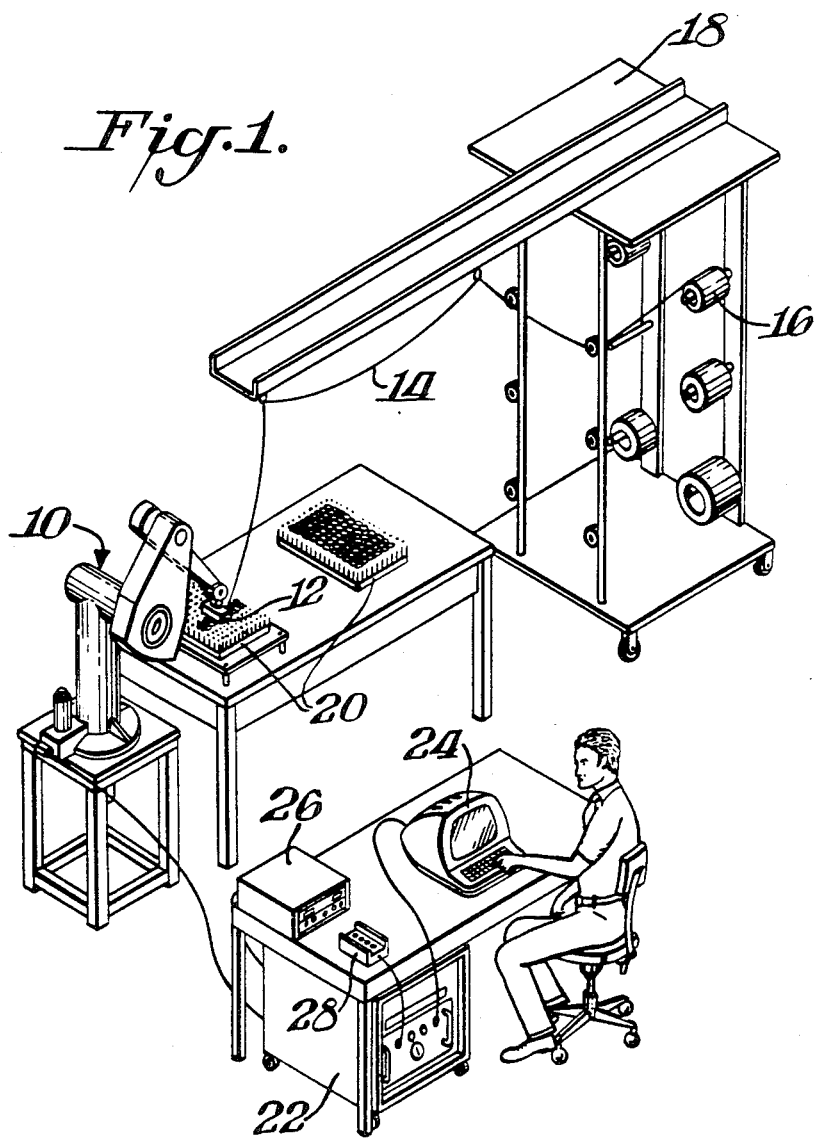
FIG. 1 is a schematic illustration of the manner in which the apparatus of the invention is used to form a web.

In FIG. 1, the apparatus of the present invention is shown in association with other elements of a web-forming installation. On the arm of a robot 10, there is a dispensing head 12 through which a filamentary yarn 14 is pulled from a package 16 on a creel 18. Robot 10 functions as an automatic manipulator for moving head 12 relative to a bed 20 of deflectible pins according to a program set in a microprocessor within a controller 22. Other elements coupled to the controller are a CRT terminal 24, a direct current (dc) power supply 26 and a teach pendant or manual controller 28. As will be explained more fully hereinafter, yarn 14 is held by its engagement with pins in bed 20 and pulled from package 16 by the movement of head 12 in response to instructions from the programmed controller 22, i.e., according to the pattern desired for a given web.

Referring to FIGS. 2-5, the robotized winding head 12 includes a block 30 having a step 32 provided with threaded passages 34 for one or more strand-guiding tubes 35. Block 30 is fastened to a bracket 36 which, in turn, is fastened to a mounting disc at the end of the arm on robot 10.

Each tube 35 has as straight length that extends through a threaded housing 38 and terminates in a curved length or horn 40. The straight length is freely rotatable in spaced sleeve bearings 42 in housing 38 and is retained by collars 44, 45. Housing 38 is mounted in one of the threaded passages 34.

Figure 10:
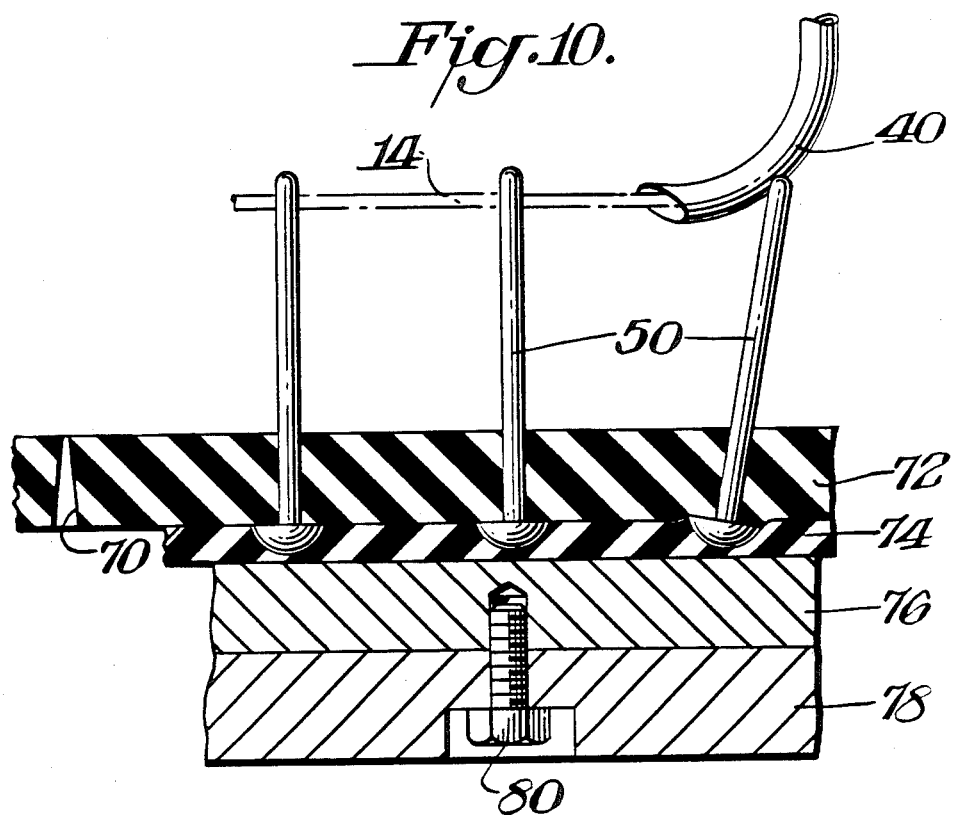
FIG. 10 is a fragmentary, enlarged view of the bed shown in FIGS. 1, 2 and 7-9.

Referring now to FIGS. 2, 5 and 10, horn 40 on tube 35 projects into the bed 20 of pins 50 and trails the straight length as head 12 is moved by robot 10. Pins 50 are deflected as horn 40 moves through the bed. Due to the resilience of their mounting, the pins spring back toward a normally upright position and hold yarn 14 in the desired pattern. As noted above, yarn 14 is anchored in the bed by frictional engagement with the pins and is pulled from package 16 by the programmed movement of dispensing head 12. Horn 40 dispenses yarn 14 beneath the tops of the pins 50 and also engages preceding loops to insure their placement at the desired depth in the bed 20.

Figure 6:
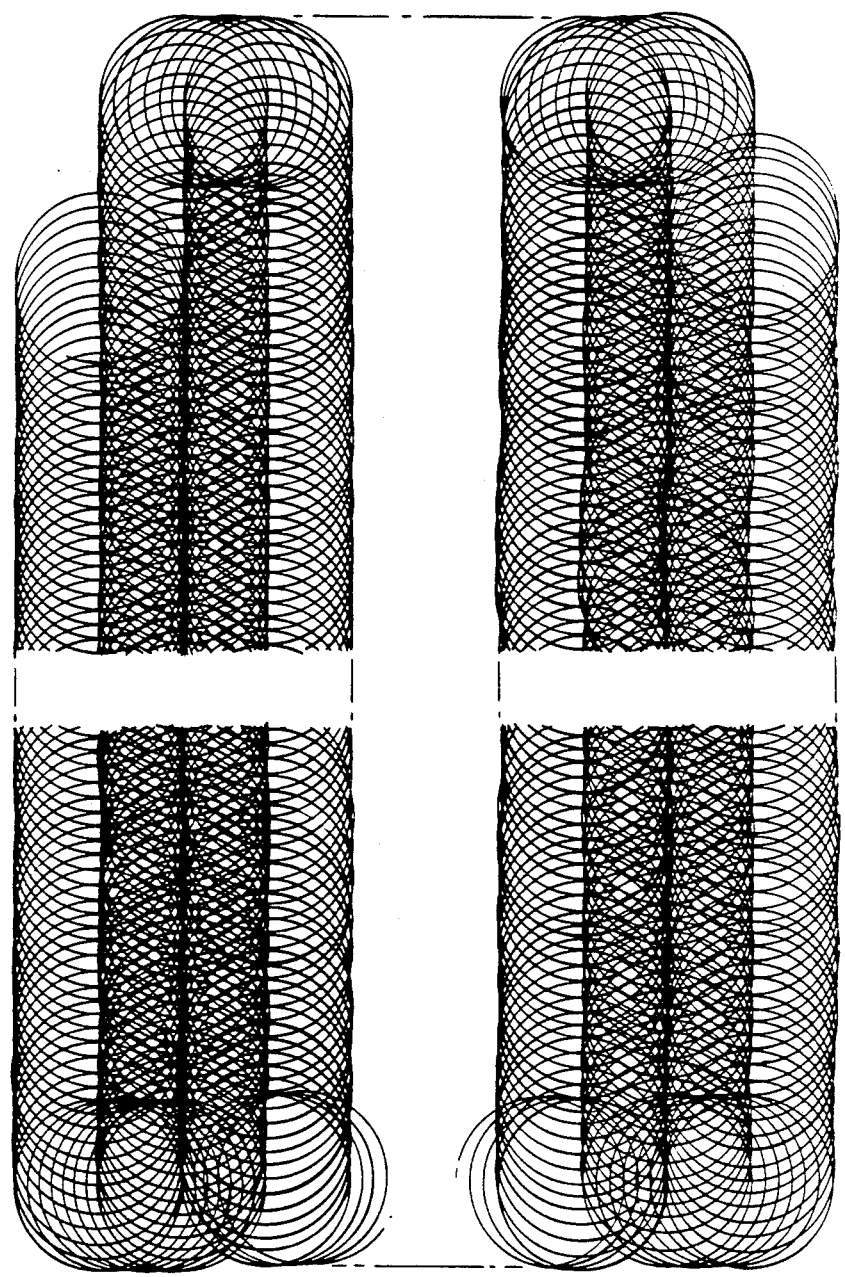
FIG. 6 shows fragments of a web formed with precise uniformity on the apparatus of the present invention.

With the winding head 12 fixed to the robot, as shown in FIG. 2, a web of the type shown in FIG. 6 is formed by programming the robot to move the head in a circular motion as it is advanced longitudinally through the length of the pattern. At the end of each row, the head is traversed laterally and advanced longitudinally in the reverse direction. In actuality, the circular motion is a succession of orthogonal, linear steps but the yarn is deposited in a shingled series of in-line loops due to the manner in which pins 50 spring back toward their normal, upright position.

Figure 9:
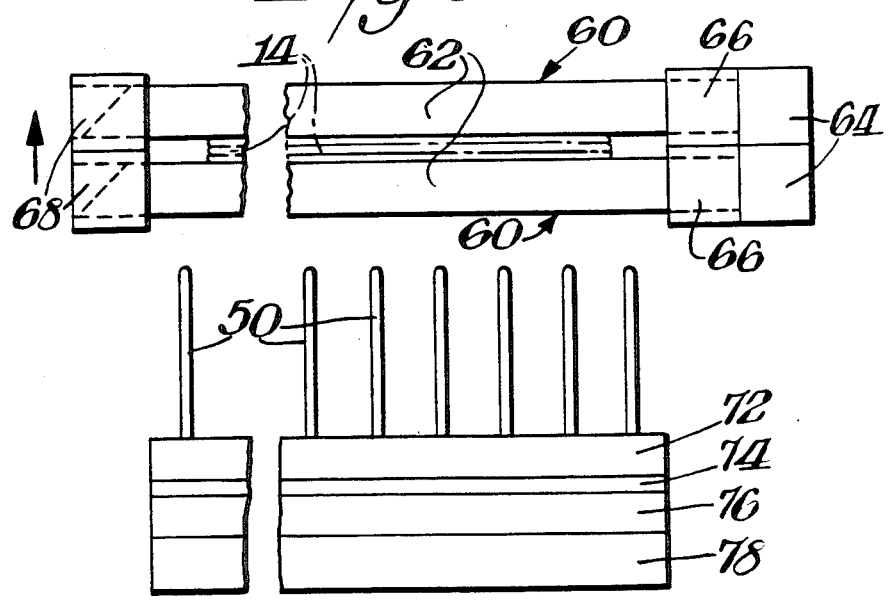
FIG. 9 illustrates transfer of a web from the bed on which it was formed.

A transfer device 60 for removing a web from the beds of pins 50 is shown in FIGS. 7 and 8. Device 60 includes a plurality of spaced blades 62 attached at one end to a bar 64. The free ends of the blades 62 are held in alignment by a sliding bar 66 as they are inserted into the bed of pins beneath a formed web. Once passed beneath the web, the ends of blades 62 are retained in another bar 68. A second device 60 is located as shown in FIG. 9 and the assembly is then used to remove the web from the bed of pins. A binder resin is applied to insure the integrity of the web which can then be transferred to a suitable mold for fabrication of a composite structure.

Details of a base and retainer for the bed of pins 50 appear in FIG. 10 where it will be seen that the shanks of the pins project through holes 70 in an elastomeric sheet 72. The heads of the pins are embedded in a layer 74 of elastomeric adhesive which also serves to adhere sheet 72 to a retainer plate 76. A selected number of retainers is assembled and each is fastened to a base plate 78 by screws 80.

Figure 11:
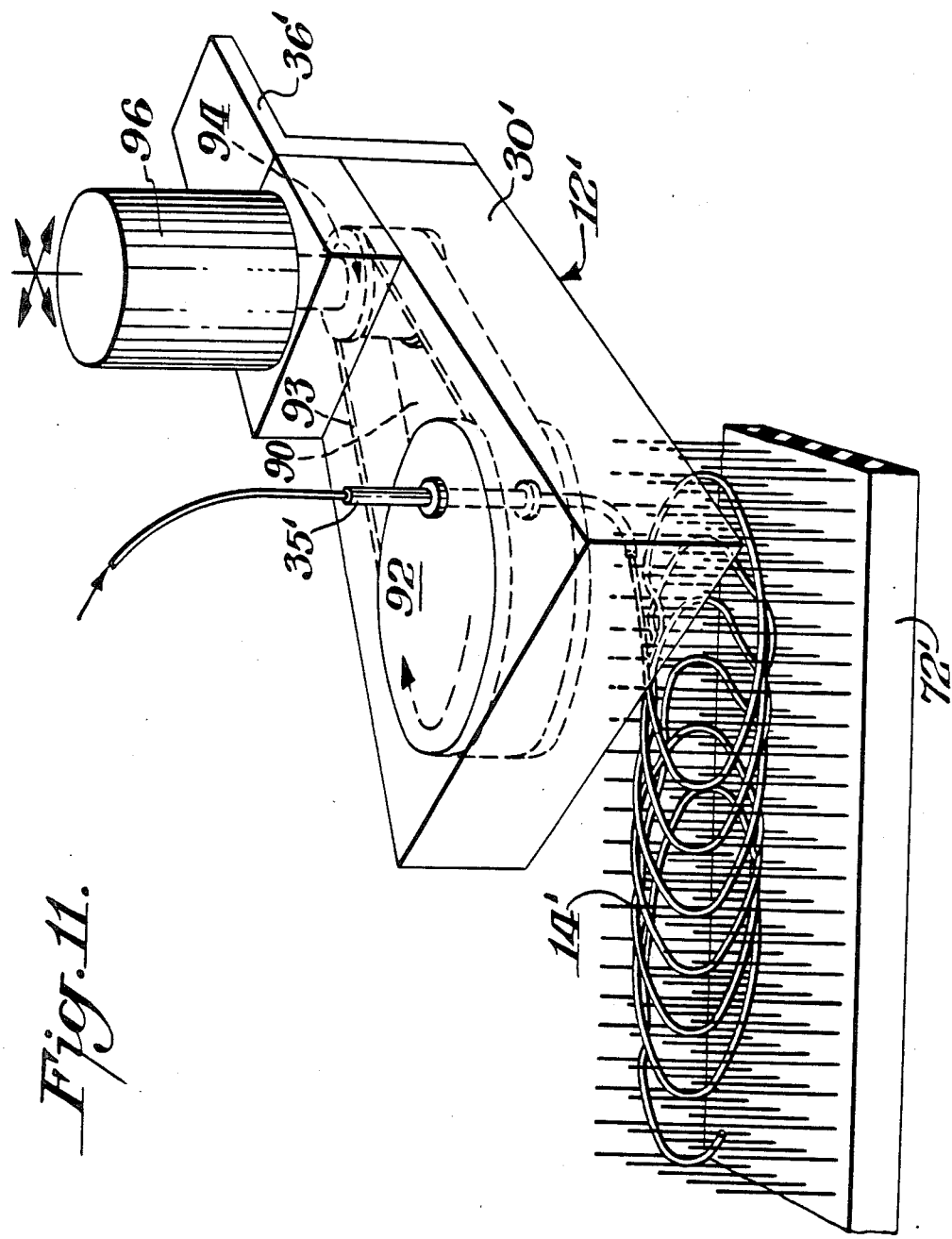
FIG. 11 is a perspective view of a modification of the apparatus.

The modification shown in FIG. 11 has a head 12' adapted for attachment to the arm of a robot. Head 12' includes a block 30' provided with an aperture 90 which receives a rotor 92, a belt 93 and a pulley 94. A motor 96 is coupled to the pulley 94 for driving rotor 92. A strand-guiding tube 35' is mounted eccentrically in rotor 92. With this embodiment, the robot can be programmed to move head 12' linearly and the rotary movement of rotor 92 causes a shingled series of in-line loops to be deposited in the bed of pins. The curved horn on strand-guiding tube 35' pushes successive loops to the same level in each row, thus forming an ordered array of the type shown in FIG. 6.

The nonwoven webs produced by the apparatus of this invention can be used for many purposes. For example, webs with a uniform, precisely ordered laydown of the type shown in FIG. 6 have been formed and used as reinforcements in composite panels. In addition to their use as reinforcing fabrics, the precisely ordered webs could be used as base material for coating or tufting and for making needled nonwovens.

In the end uses where composites are reinforced with a nonwoven web and subjected to localized stresses, the apparatus of this invention is capable of precisely locating extra fibers at the needed locations to handle these localized stresses.

Further, many composites in their final form have openings in them. In the past, the fabric would be cut and a portion removed to accommodate the openings. This causes fabric waste and fiber discontinuities. The apparatus disclosed herein can precisely lay down fibers around such openings, providing improved reinforcement and reduced fiber waste.

The apparatus of this invention also can be used as the laydown arrangement for a larger apparatus which temporarily stores and treats, on a continuous basis, continuous strands. For example, it could be used in the apparatus illustrated in FIG. 5 of U.S. Pat. No. 3,318,013.

Where used herein, the term "strand" is meant to denote a yarn of continuous filaments or a yarn spun from staple fibers. It also denotes such a yarn joined with another of the same or a different composition. In the latter respect, yarns of graphite, polyamide and polyester have been used in webs formed on the apparatus of the present invention.

What is claimed as new and desired to be secured by Letters Patent is:

1. An apparatus comprising a bed of resiliently mounted, deflectible pins and a movable head for depositing a continuous strand in said bed according to a desired pattern, said head including a freely rotatable, strand-guiding tube projecting therefrom and terminating in a horn, said horn being a curved length projecting into said bed sufficiently to dispense the strand beneath the tops of the pins.

2. The apparaus of claim 1 wherein is provided an automated manipulator and said head is attached thereto for movement according to said pattern.

3. The apparatus of claim 1 wherein said head is robotized for movement according to said pattern.

4. The apparatus of claim 3 wherein said head is a block having a passage therethrough and said tube is rotatably mounted in said passage.

5. The apparatus of claim 3 wherein said head has an aperture extending therethrough and a driven rotor mounted in said aperture, said rotor having an eccentric passage therethrough, said tube being rotatably mounted in said passage.

6. The apparatus of claim 1 wherein said bed comprises a plate having a perforated, elastomeric sheet adhered thereto, said pins having shanks projecting through perforations in the sheet from heads located between the plate and sheet.

7. The apparatus of claim 6 wherein the pins are aligned in a plurality of rows and wherein is provided a transfer device for lifting a deposited strand from the bed, said transfer device comprising a plurality of blades and transverse bars holding the blades in spaced parallelism, each blade being adapted for insertion into said bed, beneath a deposited pattern, between adjacent rows of pins.

* * * * *